Jan. 18, 1944.     H. R. CRAGO     2,339,618
SELECTIVE RATE CONTROL SYSTEM
Filed Oct. 17, 1942
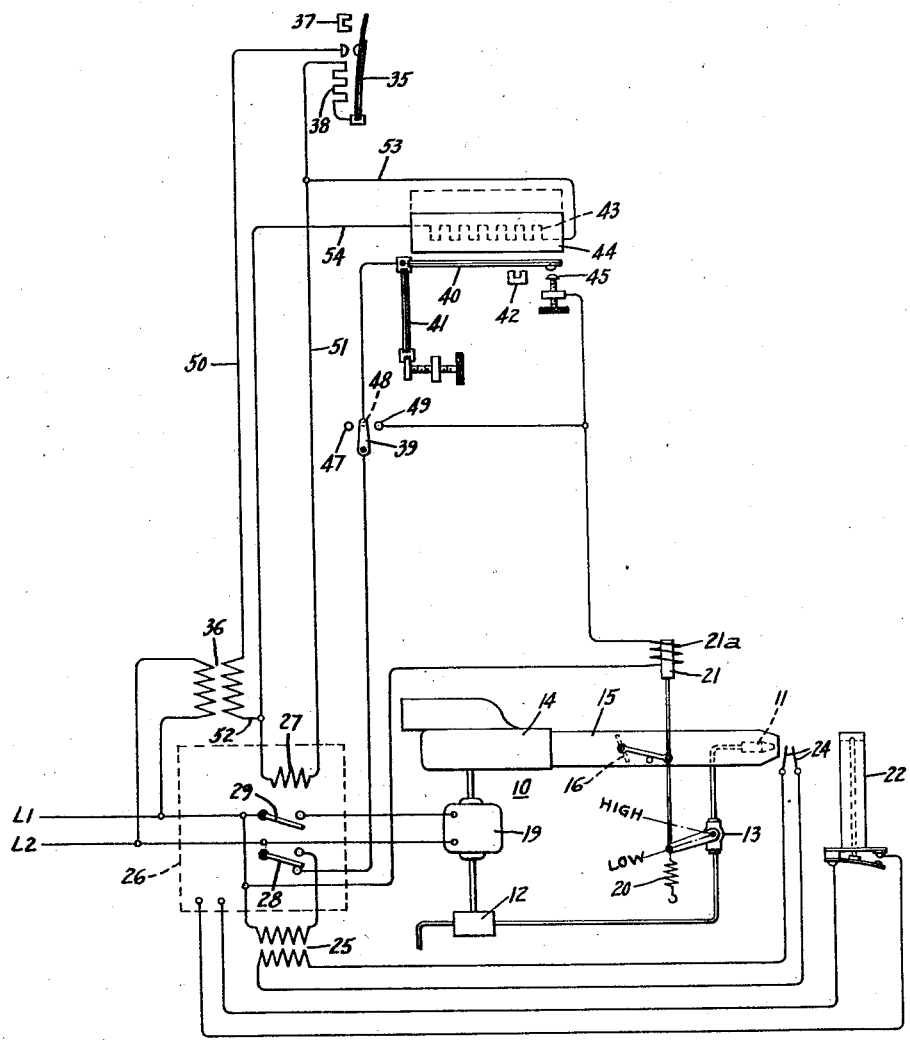
Inventor:
Harry R. Crago,
by  Harry E. Dunham
His Attorney.

Patented Jan. 18, 1944

2,339,618

UNITED STATES PATENT OFFICE 2,339,618

SELECTIVE RATE CONTROL SYSTEM

Harry R. Crago, Schenectady, N. Y., assignor to General Electric Company, a corporation of New York Application October 17, 1942, Serial No. 462,421

6 Claims. (Cl. 236—9)

The invention relates to selective rate control systems, and provides an improved selective manual and automatic rate control for a variable rate condition changing device that is operated intermittently under the control of an automatic condition responsive device for regulating a variable condition such as temperature, pressure, humidity or the like. The improved selective rate intermittent control system is of particular advantage for controlling the operation of a two-rate oil burner in domestic heating service.

The principal object is to provide an improved selective manual and automatic variable rate control combination for an automatic condition responsive intermittent control system and apparatus whereby a variable rate condition changing device such as a two-rate burner may be automatically operated intermittently at either a low or a high rate as selected under manual control to meet the load demand, or when the manual control is operated to a predetermined position may be automatically operated intermittently at the low rate only so long as such low rate intermittent operation will meet an increasing load demand, and then automatically shifted to automatic intermittent operation at the high rate to take care of further increase in the load within the high rate range, and automatically returned to intermittent operation at the low rate only upon a predetermined decrease of the load within the intermittent low rate range.

A special object is to provide an improved variable rate control wherein the rate may be selectively controlled by both a manual selective control means and an automatic control means dependent upon the relative times of intermittent operation and non-operation of the condition changing device within both a low rate range and a high rate range.

A further object is to insure automatically that the variable rate condition changing device is always started into operation at the low rate even though either the selective manual or the automatic rate changing control means may be calling for operation at the high rate. This is of particular advantage in controlling a two-rate oil burner, where ignition difficulties are overcome when the operation thereof is always started at the low rate.

A more specific object is to provide an improved condition responsive variable rate intermittent control system and apparatus of the above character wherein the intermittent operation of the condition changing device is always effected at both low and high rates under the control of a condition responsive master switch while the change in operating rate of the device may be effected selectively under both manual control and under the control of an electrically heated thermal responsive switch having cooperating heat storage means and adjustable differential operating means such that the automatic rate changing thermal responsive control switch is capable of integrating within overlapping low and high rate ranges the relative times of intermittent closing and opening of the condition responsive master switch.

A further specific object is to provide an improved three-position manual selective control for selectively rendering the improved automatic rate changing control effective or ineffective and also independently effecting intermittent operation of the condition changing device at the high or low rate under the control of the condition responsive master switch as desired to meet the existing operating conditions. This is of particular advantage in a two-rate oil burner heating system since such a manual rate selective control enables the minimum rate operation to be enforced at night or other times when high rate operation may be unnecessary. Also, in some forms of domestic heating systems, particularly warm air or steam systems, an enforced operation of the burner at the high rate by the manual selective control may produce better distribution of the heat to a desired room or other location than can be obtained with the low rate operation, particularly when the master control thermostat is in some other room or location.

In the accompanying drawing which illustrates a preferred embodiment of the invention, the single figure is a schematic circuit diagram of a selective manual and automatic high and low rate intermittent oil burner control system embodying the improvements of the present invention.

The oil burner mechanism 10 is shown schematically as of the conventional variable rate type having the oil atomizing nozzle 11 supplied with oil under pressure from the oil pump 12 through the two-rate control valve 13 with the combustion air supplied from the blower 14 through the air nozzle 15 under the control of the two-rate air flow control damper 16. The oil pump 12 and the blower 14 are driven by the electric motor 19. The two-rate oil valve 13 and the two-rate air flow control damper 16 are interconnected so as to be biased by the spring 20 to the low rate position and operated to the high rate position by means of the rate changing electromagnet 21.

Suitable burner ignition electrodes 24 are shown energized from the ignition transformer 25 to effect ignition of the atomized oil issuing from the oil nozzle 11 during the starting of the burner into operation. A conventional flame detector switch 22 is provided for detecting the successful establishment of combustion. A burner starting sequence control mechanism 26 of any ordinary type may be provided for coordinating the various control functions involved in starting operation of the oil burner when operation is initiated upon energization of the winding 27. As the detailed construction of the burner starting sequence control mechanism 26 is not of the essence of the present invention, the details thereof are not shown although preferably the sequence control is of the improved type more fully illustrated and described in the Eaton Patent 2,278,252. It will be understood, however, that the ordinary burner starting control mechanism 26 embodies a suitable operating mechanism which is rendered effective upon energization of the burner starting winding 27 to move the ignition control switch member 28 to energize the primary of the ignition transformer 25 either before or as soon as the main burner switch member 29 is closed to energize the burner driving motor 19. This insures that ignition is present whenever the operation of the burner is started. It will also be understood that whenever combustion is successfully established the flame detector switch 22 functions to maintain the main burner switch 29 closed as long as the winding 27 is maintained energized while the ignition switch 28 is operated to deenergize the ignition transformer.

The energization of the burner starting control winding 27 is under the control of the thermostatic master switch 35, preferably being energized from the low voltage winding of the transformer 36 having its primary continuously energized from the supply lines L1, L2. Preferably, the thermostatic switch 35 is provided with a snap action differential magnet 37 and a "preheat" coil 38. The thermostatic switch 35 is responsive to a temperature condition that is varied by operation of the oil burner 10. Thus the thermostatic switch 35 may be a room thermostat in a house heated by the oil burner 10.

In accordance with the present invention, the energization of the operating winding 21a of the rate changing electromagnet 21 is under both selective manual and automatic control. Selective manual rate control is provided by the three-position manual selective switch 39 shown in the automatic rate control position. The automatic rate control is effected by means of a thermal responsive switch 40 provided with an ambient compensating thermal element 41, a differential operating magnet 42 and an electric heater 43 having a heat storage mass 44. The electric heater 43 is connected to be energized whenever the condition responsive thermostatic switch 35 is closed, preferably being energized in parallel with the oil burner control winding 27 as illustrated in the drawing. The operating differential of the thermal responsive switch 40 is varied for operation within overlapping low and high rate time ratio ranges by adjusting the position of the contact 45 relative to the differential snap action operating electromagnet 42. The electric heater 43 and its heat storage mass 44, together with the differential operating electromagnet 42, are thus proportioned to provide a special characteristic of operation for the thermal responsive switch 40 that will enable this switch to integrate within the overlapping burner low and high rate ranges the relative times of closure and opening of the master control thermostatic switch 35 so as to effect energization of the rate changing electromagnet 21 only when the ratio of operation time to non-operation time of the oil burner 10 at the low rate exceeds a predetermined high value and to effect deenergization of the rate changing electromagnet 21 only when the ratio of operation time to non-operation time of the oil burner 10 at the high rate falls below a predetermined low value.

In order to insure that the oil burner 10 is always started at the low rate so as to overcome ignition difficulties, the energizing circuit for the rate changing electromagnet 21 is placed under the control of the ignition switch 28. Thus the energizing circuit for electromagnet 21 can be completed only when the ignition switch 28 is in the position in which it is shown wherein the ignition transformer 25 is deenergized. Thus, when switch 28 is operated to energize the ignition transformer 25 during the starting of the burner 10, it is impossible for the rate changing electromagnet 21 to be energized.

*Operation*

With the selective control switch 39 in its automatic control position as shown, when the temperature condition to which the thermostatic master control switch 35 is responsive falls below the desired value, the contacts of thermostatic switch 35 are closed thereby energizing the starting winding 27 of the oil burner control mechanism 26 through a circuit extending from the secondary of the transformer 36, conductor 51, switch 35, conductor 50, the starting winding 27, and conductor 52. At the same time, heater 43 of the automatic rate changing control 40 is energized in parallel with the winding 27 through the conductors 53 and 54. As a result of energization of winding 27, the burner control mechanism 26 operates the ignition switch 28 to energize ignition transformer 25 and thereby establish an igniting arc across the electrodes 24 and also closes the burner starting switch 29 to energize the driving motor 19 and thereby supply oil from the pump 12 to the burner nozzle 11 through the oil rate control valve 13 in its low rate biased position and, at the same time, supply combustion air from the blower 14 to the air nozzle 15 with the air flow control damper 16 in its low rate position. When the combustion of the atomized oil is successfully established, the flame detector 22 responds to maintain a motor energizing switch 29 closed while permitting the ignition switch 28 to deenergize ignition transformer 25 and close the energizing circuit for the rate changing electromagnet 21.

When the operation of the oil burner 10 at the low rate has raised the temperature to which the thermostatic switch 35 is responsive to the desired value, thermostatic switch 35 will open its contacts to deenergize the burner control winding 27 and, at the same time, deenergize the heater 43 of the automatic rate changing control 40. The length of time that the oil burner 10 is maintained in operation will depend upon the load demand. Consequently, when the load demand is relatively low, the burner 10 will be operated only a relatively short time to raise the temperature to which the thermostatic switch 35 is responsive to the desired value. Under these relatively light load conditions, the contacts of the thermostatic switch 35 will be closed for relatively short intervals and open for relatively long intervals. As a result, the heater 43 will be energized only for relatively short intervals and deenergized for relatively long intervals. Consequently, due to the heat storage mass 44, the temperature of the thermal responsive rate changing switch 40 will not be raised to the predetermined value at which the contact 45 is engaged by the switch 40. Thus, the rate changing electromagnet 21 will remain unenergized and the operation of the oil burner 10 will be intermittently started and stopped at the low rate under the control of the thermostatic switch 35.

In case the load demand increases, the relative time of intermittent operation of the burner 10 with respect to the time of non-operation will likewise increase so that the contacts of thermostatic switch 35 will remain closed for relatively long intervals and be opened only for relatively short intervals. Under these conditions, the heater 43 will correspondingly be intermittently energized for relatively long intervals and deenergized for relatively short intervals. Consequently, the temperature of the thermal responsive switch 40 will be raised to the predetermined value at which it is operated with a snap action into engagement with the contact 45. This will energize the rate changing electromagnet 21 and effect operation of the oil rate control valve 13 and the air flow control damper 16 from their low rate positions to which they are biased to their high rate positions as soon as the ignition switch 28 is operated to deenergize the ignition transformer 25 after the burner 10 is successfully started at the low rate.

Burner 10 will now operate at the high rate thereby increasing the heat output of the burner. Consequently, the time of operation of the burner required to meet the load demand will decrease and the non-operating time will correspondingly increase. However, due to the differential action of the magnet 42 as determined by adjustment of contact 45, the thermal switch 40 will be maintained in engagement with contact 45 until the operating time of the burner at the high rate is relatively short. Under these conditions, the time of energization of the heater 43 will be considerably less than the non-operating time and, consequently, the temperature of the thermal responsive switch 40 will decrease to the value required to effect disengagement of the contact 45. This will deenergize the rate changing electromagnet 21 to effect further operation of the burner 10 at the low rate.

Preferably, with the burner heat output at the high rate substantially twice the heat output at the low rate, the heater 43, the heat storage mass 44 and the differential operating magnet 42 of the thermal responsive switch 40 are proportioned so that the switch 40 will operate to engage contact 45 when the burner 10 is operating intermittently at the low rate at least 90 per cent of the time and will be maintained in engagement with the contact 45 as long as the burner 10 is operating intermittently at the high rate 40 per cent of the time. Thus, in a house heating system, the oil burner will ordinarily be operated intermittently at the low rate except under very severe weather conditions when the control will automatically shift to the high rate in order to increase the heat output of the burner sufficiently to meet the peak load demand. Since the required time temperature characteristics of the thermal responsive rate controlling switch 40 will depend to a large extent upon the time temperature characteristics of the house heating system, preferably provision is made for increasing the heat storage mass 44, as indicated by the dotted lines, and for varying the operating differential by adjustment of contact 45 relative to the magnet 42. In this way the operating characteristics of the thermal responsive rate changing switch 40 may be coordinated with the time constant of the house heating system to effect the change-over from the low to the high and the high to the low rates responsively to different integrated relative times of operation and non-operation of the burner in the manner described above. The ambient temperature compensating element 41 serves to render the operation of the thermal responsive switch 40 substantially independent of variations in the ambient temperature.

The three-position manual selective control switch 39 enables the householder to selectively effect operation of the oil burner 10 either continuously at the low rate when the selective switch 39 is in its off position 47, or under automatic rate changing control of the thermal responsive switch 40 when the selective switch 39 is in its automatic position 48, or intermittent operation of the burner 10 at the high rate when the manual selective switch 46 is in its position 49. With the manual selective switch 39 in position 47 the energizing circuit of the rate changing electromagnet 21 is continuously interrupted. Hence, the oil rate control valve 13 and the air flow control damper 16 remain continuously in their low rate positions to which they are biased by the spring 20. With the manual selective switch 39 in its position 48, the rate changing electromagnet 21 is under the automatic control of thermal responsive switch 40. However, when manual selective switch 39 is in position 49, then the rate changing electromagnet 21 is always energized whenever the switch 28 of the oil burner control mechanism 26 is in its position in which the ignition transformer 25 is deenergized. Thus, the manual selective switch 39 enables the householder to select the operating rate of the burner to meet any operating conditions that may arise.

What I claim as new and desire to secure by Letters Patent of the United States is:

1. In combination, a two-rate oil burner having a driving motor, an igniter, and combustion rate changing means provided with an operating electromagnet, means including a thermostatic switch for energizing said driving motor and igniter to start operation of said burner to establish combustion, combustion responsive means for controlling energization of said electromagnet to insure the starting of said burner to establish combustion at the lower rate and for deenergizing said igniter after combustion is established, and selective rate control means rendered effective under control of said combustion responsive means only upon establishment of combustion and including both a manual rate selective switch for independently energizing and deenergizing said electromagnet and a thermal time integrating rate selecting means having a heater connected to be energized and deenergized by said thermostatic switch and provided with a thermal switch operable responsively to the relative time of energization and deenergization of said heater and connected only upon a predetermined operation of said rate-selective switch to automatically control the energization and deenergization of said rate changing electromagnet.

2. In a thermostatic control system for operating a two-rate oil burner, in combination, means including a thermostatic switch for starting and stopping the operation, means including a combustion responsive device for preventing the starting of operation at the higher rate, rate control means rendered effective under control of said device and including both a manual rate selective switch for selectively changing the rate of operation after the starting thereof at a lower rate and time integrating rate changing means responsive to the relative time of operation and non-operation provided by said thermostatic switch and having an automatic rate control switch rendered effective only upon a predetermined operation of said manual rate selective switch.

3. In combination, a variable rate condition changing device having rate changing means biased to a predetermined rate for insuring the starting of said device at said rate, condition responsive means for starting and stopping operation of said device, electrical means responsive to the relative times of operation and non-operation of said device at said predetermined rate for operating said rate changing means against its bias, and selective control means for selectively rendering said electrical means ineffective and independently operating said rate changing means against its bias.

4. In a selective rate intermittent control system of the character described, in combination, intermittent operating means having a condition responsive master starting and stopping switch and means for insuring the starting of operation at a predetermined low rate, electrically operated rate changing means having a manual selective control switch, and time integrating means responsive to the relative time of closure and opening of said master switch and having a switch connected for controlling said rate changing means upon a predetermined operation of said selective control switch.

5. In combination, a two-rate condition changing device having rate changing means, means including a condition responsive switch mechanism for starting and stopping operation of said device, means for insuring the starting of operation at the lower rate, manual control means for selectively operating said rate changing means, and time integrating means responsive to the relative time of operation and non-operation of said device and having means for controlling said rate changing means rendered effective upon a predetermined operation of said manual control means.

6. In a condition responsive control system for operating a variable rate condition changing device, in combination, condition responsive operation starting and stopping means having means for insuring the starting of operation at a low rate, manual selective control means for changing the operation rate and time integrating means responsive to the relative time of operation and non-operation provided by said operation starting and stopping means and having an automatic operation rate control element rendered effective upon a predetermined operation of said selective control means.

HARRY R. CRAGO.